Oct. 12, 1965 R. S. LUNDIN 3,211,018
SYNCHRONOUS TIMING MOTOR ASSEMBLY HAVING INTEGRAL CLUTCH
Filed May 3, 1961
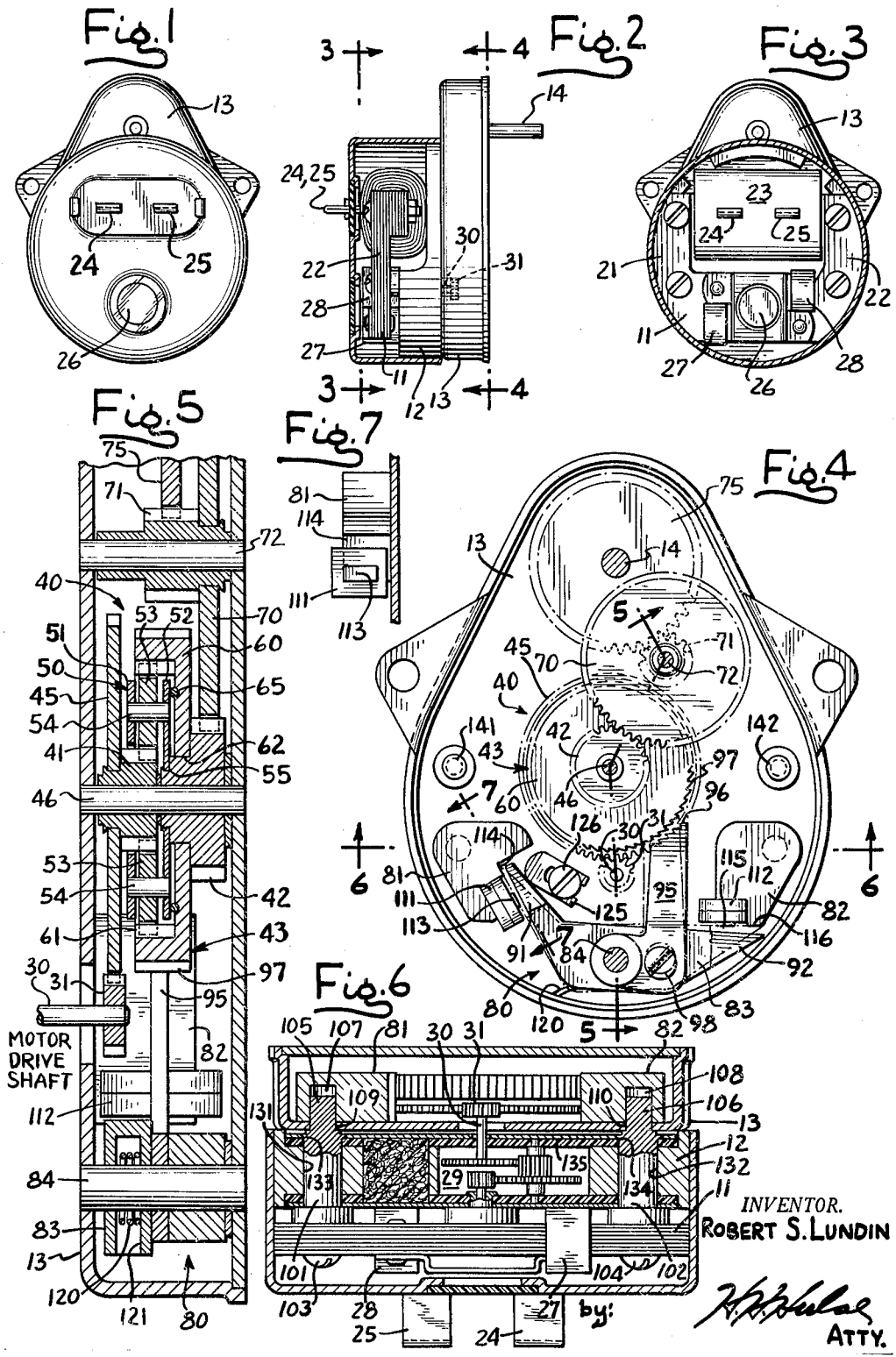
INVENTOR.
ROBERT S. LUNDIN
ATTY.

United States Patent Office 3,211,018
Patented Oct. 12, 1965

3,211,018
SYNCHRONOUS TIMING MOTOR ASSEMBLY
HAVING INTEGRAL CLUTCH
Robert S. Lundin, Thomaston, Conn., assignor to General Time Corporation, New York, N.Y., a corporation of Delaware
Filed May 3, 1961, Ser. No. 107,378
8 Claims. (Cl. 74—472)

The present invention relates to synchronous timing devices and more particularly to a timing device having means for automatically clutching the output shaft when the timing device is energized.

In timing devices having a small synchronous motor, gear train, and output shaft, it is frequently helpful to have means for automatically clutching the output shaft when the device is electrically energized and for declutching it, i.e., disconnecting the gear train, when the device is deenergized so that under the latter condition the unit is free wheeling. Thus by using a return spring on the output shaft, such shaft and any output element connected thereto may be returned to a reference position automatically at the end of the time interval. For example, where the output element is simply an elapsed time indicator, such indicator is, at the end of the elapsed time, returned to its "zero" position in readiness for a subsequent cycle. Various schemes have been devised to accomplish the above but prior devices have been either lacking in reliability or so expensive, complex, or bulky, that the number of useful applications has been severely limited.

It is an object of the present invention to provide a synchronous timing device having an integral automatically operated clutch but which is simple and compact and which may be constructed in the same space and with the same outer configuration as motor-gear train assemblies not having the clutching feature. It is another object to provide a clutch-type timing device which makes maximum use of conventional motor assemblies and gear boxes and in which the clutching feature is brought about with minimum modification thereof and using a minimum number of parts. Consequently it is an object to provide a timing motor assembly having automatically clutched output and which may be inexpensively manufactured on a production line basis for sale at a price which is sufficiently low as to enable use universally wherever a clutch-type timing device is required.

It is another object of the present invention to provide a timing device having a clutched output which is positive and reliable in operation and which, although of compact size, nevertheless is capable of exerting a high output torque for driving various output elements requiring appreciable power for effective actuation.

It is still another object to provide in a clutch-type timing device an improved clutching mechanism of the gear type. In this connection it is an object to provide a timing device having a clutched output and in which the clutching element is stationarily pivoted for utilization of the magnetic field of the driving motor.

It is a further object of the present invention to provide a clutch-type timing assembly which is capable of reliable operation under adverse conditions of shock and vibration and which is, therefore, ideally suited for use in military devices or in commercial devices requiring the highest degree of reliability.

Other objects and advantages of the invention will become apparent upon reference to the attached detailed description and to the drawing in which:

FIGURE 1 is an external elevation of a synchronous timing motor assembly constructed in accordance with the present invention.

FIG. 2 is a side view of the assembly shown in FIG. 1 but with the motor housing in section.

FIG. 3 is a section taken along the line 3—3 in FIG. 2.

FIG. 4 is a view of the gearbox looking along the line 4—4 in FIG. 2 with the cover removed and showing the clutching mechanism in face view.

FIG. 5 is a fragmentary section taken along the broken line 5—5 in FIG. 4 and showing the clutch mechanism in axial section.

FIG. 6 is a transverse section taken along the line 6—6 in FIG. 4 showing the magnetic coupling between the motor and clutch mechanism.

FIG. 7 is a fragment taken along the line 7—7 in FIG. 4 showing the pole face construction.

While the invention has been described in connection with a preferred embodiment, it will be understood that I do not intend to be limited to the embodiment shown but intend to cover the various alternative and equivalent constructions which may be included within the spirit and scope of the appended claims.

Turning now to the drawing, a synchronous timer motor assembly constructed in accordance with the invention includes a motor unit 11, a high speed gear capsule 12 and a low speed gearbox 13 having an output shaft 14. The operation is such that when the motor unit 11 is energized the output shaft 14 rotates at a predetermined slow speed for the driving of an elapsed time indicator or other timing device. As to the motor construction, the motor unit 11 includes a laminated magnetic core having first and second poles 21, 22 which are energized by a winding 23 having terminals 24, 25 for connection to an A.-C. supply line. Centered between the poles 21, 22 is a rotor 26 which is subjected to a rotating field by action of shading rings 27, 28. Conveniently, the rotor 26 is journaled for rotation in the high speed gear capsule 12. For the details of the high speed gear capsule, reference may be made to my copending application Ser. No. 77,658 filed December 22, 1960, now Patent No. 3,142,774. For present purposes it will suffice to say that the gear capsule includes a high speed gear train 29 which is sealed in the capsule and lubricated by oil vapor. Projecting laterally from the capsule 12 is an output shaft 30 having a pinion 31. This pinion is so positioned as to engage the input gear of the gearbox 13 when the gearbox is assembled in side by side relation to the capsule.

In carrying out the invention a clutch in the form of a gear mechanism having a control element is provided in the gearbox 13 so arranged that when the motion of the control element is blocked torque is transmitted through the gear train for slow speed rotation of the output shaft 14. Referring to FIGS. 4 and 5, the clutch indicated generally at 40 includes an input gear 41, an output gear 42 and a control element 43. The clutch is so constructed and arranged that when the control element 43 is locked in place, the input gear and output gear are positively coupled together for power transmission, but when the control element 43 is unlocked and free to rotate idly, the input gear and output gear are effectively uncoupled. Focusing upon the clutch, the input gear 41 is secured to a large diameter gear 45 which meshes with the pinion 31 of the high speed gear capsule. The input gear is telescoped over a shaft 46 which extends transversely within the gearbox. Surrounding the input gear 41 is a cage 50 which is made up of two spaced apart annular members 51, 52 carrying a set of planetary gears 53 on respective pins 54, with the planetary gears being meshed with the input gear 41. The cage 50 forms the output of the clutch mechanism, and the plate 52 thereof is secured to the output gear 42 at a spun-over joint indicated at 55. For the purpose of reacting against the planetary gears 53, a surrounding ring gear 60 is provided having internal teeth 61 and in the form of a shallow cup which surrounds the cage 50. The ring gear 60 has a central opening which is telescoped over the neck of the output gear 42 and which provides a bearing surface 62 so that the ring gear is free to rotate. The ring gear is held in a seated position on the output gear 42 and slightly spaced from the cage 50 by means of a ring 65 of antifriction material.

For the purpose of providing further speed stepdown, the output gear 42 is meshed with a gear 70 having a pinion 71 and mounted upon a shaft 72. The pinion 71, in turn, meshes with an output gear 75 which is fixed to the output shaft 14 (see FIG. 4).

It will thus be apparent from what has already been stated, and assuming that the ring gear 60 is locked in place, that power transmission takes place within the gearbox 13 as follows. Rotation of the pinion 31 powered by the motor and acting through the gear 45, produces rotation of the clutch input gear 41. Since the planetary gears 53 react against the internal teeth of the ring gear, the cage 50 which holds them rotates producing rotation of the clutch output gear 42 secured to it. Upon further reduction in speed brought about by the gear elements 70, 71 and 75, the output shaft 14 rotates at low speed but with a high available torque.

In accordance with the present invention a pair of auxiliary pole pieces are provided within the gearbox magnetically coupled to the poles of the motor and having a movable armature which is rocked into and out of locking engagement with the control element (ring gear) of the clutch mechanism as the motor is energized and deenergized. Thus in the present instance there is provided a clutch actuator generally indicated at 80 having a pair of auxiliary pole pieces 81, 82. Bridgedly arranged between the pole pieces 81, 82 for actuation by each of them is an armature 83 which is centrally pivoted on a shaft 84. This armature has a first end 91 which cooperates with the pole piece 81 and a second end 92 which cooperates with the pole piece 82. For the purpose of blockingly engaging the outer surface of the ring gear 60, the outer surface of which forms the control element, the armature is provided with an arm 95 having serrations 96 which engage matching serrations 97 formed on the outside of the ring. To facilitate adjustment of the arm 95 with respect to the armature, it is preferably made of bell crank shape as shown and having a clamping screw 98 which is screwed into the armature and which clamps the arm 95 in a precise relative position.

In order to facilitate movement of the arm 95 into and out of engaging position, the serrations 96, 97 are preferably of matching sawtooth shape with the midline of each serration tangent to the axis of the pin 84 upon which the armature and arm 95 are mounted.

In accordance with one of the aspects of the invention the auxiliary pole pieces 81, 82 are coupled to the poles of the motor by means of posts made of magnetic material which seat on the poles of the motor and which penetrate the gearbox, having a disengageable connection with the pole pieces therein. Thus in the present instance posts 101, 102 are provided which are secured to the poles of the motor by screws 103, 104 and which have tips 105, 106 (FIG. 6). For receiving the tips, holes 107, 108 are formed in the pole pieces and clearance openings 109, 110 are provided in the wall of the gearbox.

For the purpose of shading a portion of the flux fed to the armature 83, shading rings 111, 112 are provided. Taking the pole piece 81 by way of example, the shading ring 111 defines a shaded pole 113 and an adjacent, unshaded pole 114 (see also FIG. 7). Similarly in the case of the companion pole piece, the shading ring defines a shaded pole 115 and an adjacent unshaded pole 116. It will be understood that since the armature 83 is of magnetic material, it forms an auxiliary magnetic bridge between the poles of the motor. The pull exerted at the auxiliary pole pieces is cumulative.

The operation will be apparent to one skilled in the art. During one instant in the cycle of alternating current, the pole 21 of the motor will have north polarity while the pole 22 has south polarity. Because of the coupling provided by the posts 101, 102, the unshaded poles 114, 116 acquire the same polarity causing the armature to be attracted and rocked in the counterclockwise direction. This produces engagement of the serrated teeth 96, 97, blocking the ring gear of the clutch to produce power transmission, i.e., rotation of the output shaft 14. The flux applied to the armature by the shaded poles 113, 115, being offset in phase, does not pass through zero coincidentally with the current so that the armature 83 continues to be held in solidly as long as exciting current is flowing through the motor coil.

In order to produce immediate unclutching when the motor is deenergized, the armature 83 is provided with a return spring 120 which is mounted within a slot 121 (see FIG. 5) formed in the underside of the armature and with the outer end of the spring 120 reacting against the inner wall of the gearbox 13. Thus the armature, and the arm 95 connected to it, tend to be biased into the position shown in FIG. 4. For the purpose of limiting the movement in the "retract" direction, a limit stop 125 is provided having a clamping screw 126 which is screwed into the wall of the gearbox. The stop is adjusted to provide safe clearance between the teeth while nevertheless keeping the ends of the armature close to the pole pieces for generation of adequate torque for control purposes.

It may be noted that the magnetic coupling posts 101, 102 preferably extend right through clearance openings 131, 132 formed in the high speed gear capsule. The posts are, in fact, spun over as indicated at 133, 134 so that they hold the enclosing plate 135, which forms one wall of the high speed gear capsule, in place.

It is found that the above provides a magnetically efficient arrangement producing relatively high clutch-actuating forces but without imposing any substantial magnetic loading upon the poles 21, 22 of the motor. Stated in other words, sufficient flux remains at the poles of the motor so that the motor may continue to operate and to produce substantially full output torque in spite of the magnetically short circuiting effect of the armature 83. The magnetic short circuiting effect is kept at a low level because of two factors. The first is that flux is taken from the side surface of the laminations which comprise the poles 21, 22. The flux in the lamination tends to follow the plane, or grain, of the laminations and therefore only a limited amount of flux tends to leave the stack in the transverse direction. Moreover, because of the necking down which occurs at several points in the auxiliary magnetic circuit and particularly at the base of the tips 105, 106 on the posts 101, 102 a condition of high reluctance is achieved further reducing the flux which tends to flow in the short circuiting path.

It can be shown that in the present arrangement the torque exerted upon the armature is amply sufficient to maintain the control element or ring gear positively blocked in position even though the torque transmitted through the clutch may be at a relatively high level. Moreover, because of the angling of the serrations 96, 97, the reaction torque in the ring gear cannot act either to impede engagement of the serrations nor to impede their disengagement when the unit is deenergized. Consequently engagement and disengagement are positive resulting in a degree of reliability which is adequate for the most exacting of military and commercial devices.

It is one of the features of the present construction that the mechanism, formed by the clutch 40 and the clutch actuator 80, is inherently compact and may therefore be included within the low speed gearbox along with the low speed gears without enlarging the gearbox to a size greater than that conventionally employed with motors not having the automatic clutching feature. Thus it will be noted in FIG. 4 that the clutch 40 occupies a central position within the gearbox while the components comprising the actuator are arcuately distributed below it so that the space within the gearbox, is efficiently utilized. Obviously since the auxiliary pole pieces 81, 82 are energized directly from the motor, no separate magnet or source of energization need be provided.

In practice motor units including the motor 11 and associated high speed gear capsule 12, may be provided with posts 101, 102 as a part of the standard construction and whether or not such motor units are to be employed with the present clutching mechanism. The posts 101, 102 and particularly the tips 105, 106 thereof in any event serve as accurate "locaters" so that when they are inserted into the openings 109, 110 in the gearbox, the gears 31, 45 are in position for proper meshing with one another. Using the posts as locaters, the gearbox 13 may be secured to the gear capsule 12 by means of machine screws 141, 142. When it is desired to incorporate the clutching feature in the assembly, a conventional gearbox is simply replaced by the gearbox 13 described above without any further change being required. As covered in the copending application referred to above, such simple substitution of gearbox, either to bring about a change in ratio or to secure the clutching feature, enables substantial economies in production line manufacture.

It is found that the operation is reliable even in the face of shock and vibration and, if desired, the armature 83 may be balanced with respect to the axis of the pin 84 upon which it is mounted so as to minimize response to translational forces.

While a return spring may be conveniently used to drive the output shaft 14 and connected element, such as an indicator, back to a reference position, it will be apparent that the present invention is not limited thereto and the usefulness of the device is limited only by the nature of the device to which it is connected. In short, the unit described above may be employed for numerous purposes, i.e., wherever a source of timed rotative power is required which must be free wheeling during the time that the unit is deenergized.

I claim as my invention:

1. In a synchronous motor having magnetic poles and a winding for energizing the same, a gearbox secured to said motor having a gear train and an output shaft, a clutch interposed in said gear train, a clutch actuator in said gearbox including a pair of auxiliary pole pieces and a movable armature cooperating therewith and coupled to said clutch, said auxiliary pole pieces being magnetically coupled to the poles of the motor so that when the motor is energized the clutch is engaged for rotation of the output shaft, and spring return means for producing prompt disengagement of the clutch when the motor is deenergized.

2. In a synchronous motor having magnetic poles and a winding for energizing the same, a gear train coupled to the motor and having an output shaft, a clutch interposed in said gear train, a clutch actuator including a pair of auxiliary pole pieces and a movable armature cooperating therewith and controllingly coupled to said clutch, said auxiliary pole pieces being magnetically coupled to the poles of the motor so that when the motor is energized the clutch is engaged for rotation of the output shaft, and means for producing prompt disengagement of the clutch when the motor is deenergized.

3. In a synchronous motor having magnetic poles and a winding for energizing the same, a gear train coupled to the motor and having an output shaft, a clutch interposed in said gear train, a clutch actuator including shaded and unshaded pole pieces and a movable armature cooperating therewith and controllingly coupled to said clutch, said auxiliary pole pieces being magnetically coupled to the motor so that when the motor is energized the clutch is engaged for rotation of the output shaft, and means for producing prompt return of the armature when the motor is deenergized.

4. A synchronous motor having a pair of magnetic poles and a winding for energizing the same, a gearbox secured to said motor having a gear train and an output shaft, a clutch interposed in said gear train, a clutch actuator in said gearbox including a pair of auxiliary pole pieces and a centrally pivoted armature cooperating therewith, said armature being coupled to the clutch, a pair of magnetic posts seating on the poles of the motor and penetrating the gearbox for magnetic engagement with the auxiliary pole pieces, said auxiliary pole pieces having shading windings so that when the motor is energized the resulting movement of the armature actuates the clutch for slow speed rotation of the output shaft.

5. A synchronous motor having magnetic poles and a winding for energizing the same, a gearbox secured to said motor having a clutch and having an actuator for engaging and disengaging the same, said clutch actuator including a pair of auxiliary poles having shading rings and a movable armature cooperating therewith, said motor having posts of magnetic material seated on the poles thereof and having a disengageable connection with the auxiliary pole pieces in said gearbox so that when the gearbox is mechanically secured to the motor said poles enter into engagement with the auxiliary pole pieces for coupling the latter to the magnetic circuit of the motor for energization of the clutch when the motor is energized, and means including a return spring for normally urging the armature into its clutch-disengaging position.

6. In a synchronous timing motor assembly the combination comprising a synchronous motor having magnetic poles and a winding for energizing the same, a gear train having an output shaft, a clutch interposed in said gear train, said clutch having an input gear and output gear and a ring gear so arranged that upon blocking of said ring gear power is transmitted through the clutch, a pair of auxiliary pole pieces magnetically coupled to the poles of the motor, a rockable armature cooperating with said pole pieces, said ring gear having a serrated outer surface and said armature having a serrated portion so that when the motor is energized the resulting movement of the armature causes the serrations to be engaged thereby blocking the ring gear for transmission of power from the motor to the output shaft, and means including a spring for retracting the armature into disengaged position when the motor is deenergized for free wheeling of the output shaft.

7. In a synchronous timing motor assembly the combination comprising a synchronous motor having magnetic poles and a winding for energizing the same, a gear train having an output shaft, a clutch interposed in said gear train, said clutch having an input gear and output gear and a ring gear so arranged that upon blocking of said ring gear power is transmitted through the clutch, a pair of auxiliary pole pieces magnetically coupled to the poles of the motor, a rockable armature cooperating with said pole pieces, said ring gear having a serrated outer surface and said armature having a serrated portion so that when the motor is energized the resulting movement of the armature causes the serrations to be engaged thereby blocking the ring gear for transmission of power from the motor to the output shaft, the serrations being of mating sawtooth configuration with the serrations on the armature being oriented tangentially with respect to the axis of the armature for ready separation under load.

8. In a synchronous motor timing assembly the combination comprising a motor having a pair of poles and a winding for energizing the same, a high speed gear capsule adjacent the motor and coupled to it, a low speed gearbox arranged adjacent the high speed gear capsule and coupled to it to provide additional speed reduction, a clutch in said low speed gearbox and included in the driving train thereof, said clutch having a clutch actuator including a pair of auxiliary pole pieces and a movable armature cooperating therewith, said high speed gear capsule having a pair of posts of magnetic material extending therethrough with the ends of the posts being magnetically coupled to the poles of the motor and to the auxiliary pole pieces respectively so that the auxiliary pole pieces are energized for operation of the clutch whenever said motor is energized.

References Cited by the Examiner
UNITED STATES PATENTS

| | | | |
|---|---|---|---|
| 694,370 | 3/02 | Gill | 74—472 |
| 1,287,305 | 12/18 | Heinze | 74—785 |
| 1,708,941 | 4/29 | Dean | 74—785 |
| 2,370,872 | 3/45 | Miller et al. | 74—472 |
| 2,456,444 | 12/48 | Reid et al. | 74—472 |
| 2,482,032 | 9/49 | Schweitzer | 310—83 |
| 2,655,820 | 10/53 | Baines | 74—785 |
| 2,788,455 | 4/57 | Kohlhagen | 310—83 |
| 2,793,307 | 5/57 | Gallagher | 310—83 |

DON A. WAITE, *Primary Examiner.*

BROUGHTON G. DURHAM, *Examiner.*